United States Patent
Lukac et al.

(10) Patent No.: US 10,904,299 B2
(45) Date of Patent: Jan. 26, 2021

(54) ALTERNATIVE NETWORK ADDRESS TYPE (ANAT) ENCODING AND MEDIA INTERWORKING

(71) Applicant: Avaya Inc., Santa Clara, CA (US)

(72) Inventors: Tibor Lukac, Superior, CO (US); Harsh V. Mendiratta, East Brunswick, NJ (US)

(73) Assignee: Avaya Inc., Santa Clara, CA (US)

( * ) Notice: Subject to any disclaimer, the term of this patent is extended or adjusted under 35 U.S.C. 154(b) by 333 days.

(21) Appl. No.: 15/617,650

(22) Filed: Jun. 8, 2017

(65) Prior Publication Data

US 2018/0359291 A1 Dec. 13, 2018

(51) Int. Cl.
 *H04L 29/06* (2006.01)
(52) U.S. Cl.
 CPC ........ *H04L 65/1073* (2013.01); *H04L 65/105* (2013.01); *H04L 65/1006* (2013.01); *H04L 65/1069* (2013.01)
(58) Field of Classification Search
 None
 See application file for complete search history.

(56) References Cited

U.S. PATENT DOCUMENTS

| 9,197,480 B2 | 11/2015 | Boucadair et al. | |
|---|---|---|---|
| 9,232,003 B2 | 1/2016 | George | |
| 2007/0253418 A1* | 11/2007 | Shiri | H04L 29/06027 370/392 |
| 2008/0120715 A1* | 5/2008 | Bhargava | H04L 63/08 726/14 |
| 2009/0316684 A1* | 12/2009 | Buckley | H04L 29/12349 370/352 |
| 2010/0293297 A1 | 11/2010 | Perumal et al. | |
| 2011/0196975 A1* | 8/2011 | Horvath | H04L 29/12358 709/228 |

(Continued)

FOREIGN PATENT DOCUMENTS

| CN | 101068215 | 11/2007 |
|---|---|---|
| CN | 101523872 | 9/2009 |

OTHER PUBLICATIONS

Rosenberg et al. :SIP: Session Initiation Protocol RFC 3261, Jun. 2002. (Year: 2002).*

(Continued)

*Primary Examiner* — Angela Nguyen
(74) *Attorney, Agent, or Firm* — Sheridan Ross P.C.

(57) ABSTRACT

To deal with ANAT/IP version incompatibility, a communication endpoint registers with a communication system using a SIP REGISTER message. For example, the communication endpoint registers when it boots up. The SIP REGISTER message indicates that the communication endpoint: does not support the Alternative Network Address Type (ANAT) protocol or is one of IPV4 intolerant or IPV6 intolerant. When a SIP INVITE message is received with a Session Description Protocol (SDP) offer that comprises the ANAT protocol or an IP address that is opposite of the IP version intolerance of the communication endpoint, a 4XX SIP response message is sent to the sender of the SIP INVITE to indicate the incompatibility. In response, to receiving the 4XX SIP response message, the SIP INVITE is modified to be compatible with the capabilities of the communication endpoint.

20 Claims, 5 Drawing Sheets

(56) References Cited

U.S. PATENT DOCUMENTS

| | | | |
|---|---|---|---|
| 2013/0170386 A1* | 7/2013 | Gonzalez De Langarica | H04L 41/12 370/252 |
| 2015/0146541 A1* | 5/2015 | King | H04W 24/10 370/241 |
| 2016/0198241 A1* | 7/2016 | Kitazato | H04N 21/4345 725/33 |
| 2018/0176775 A1* | 6/2018 | Obaidi | H04W 76/10 |
| 2018/0227419 A1* | 8/2018 | Stojanovski | H04L 65/1016 |

OTHER PUBLICATIONS

Camarillo et al. "The Alternative Nework Address Types (ANAT) Semantics for the Session Description Protocol (SDP) Grouping Framework," Network Working Group, Jun. 2005, RFC 4091, 7 pages.
Camarillo et al. "Usage of the Session Description Protocol (SDP) Alternative Network Address Types (ANAT) Semantics in the Session Initiation Protocol (SIP)," Network Working Group, RFC 4092, Jun. 2005, 6 pages.
Rosenberg et al. "Interactive Connectivity Establishment (ICE): A Protocol for Network Address Translator (NAT) Traversal for Offer/Answer Protocols," Internet Engineering Task Force, Apr. 2010, RFC 5245, 117 pages.
Official Action for India Patent Application No. 201824021356, dated Jun. 26, 2020 5 pages.
Official Action with English Translation for China Patent Application No. 201810584927.2, dated Jul. 23, 2020 20 pages.

* cited by examiner

ALTERNATIVE NETWORK ADDRESS TYPE (ANAT) ENCODING AND MEDIA INTERWORKING

BACKGROUND

While adoption of Internet Protocol version 6 (IPV6) is finally starting to take place, the use of Internet Protocol version 4 (IPV4) is still heavily supported by legacy systems that are still prevalent in the field. Today, there are many incompatibility issues associated with IP P6/IPV4 interworking. IP version incompatibility issues can manifest itself in different ways. One such place where IP version incapability manifests itself is at the application layer. For instance, applications that use an IP address within the application may have IP incompatibility issues. One problem area is with Session Description Protocol (SDP). SDP uses IP addressing to negotiate properties of a media stream (e.g., codecs used for a voice call).

In an attempt to deal with IP version incompatibility with SDP, the Network Working Group defined RFC 4091 "The Alternative Network Address Types (ANAT) Semantics for the Session Description Protocol (SDP) Grouping Framework," June 2003, and RFC 4092 "Usage of the Session Description Protocol (SDP) Alternative Network Address Types (ANAT) Semantics in the Session Imitation Protocol (SIP)," June, 2005, which are both incorporated herein by reference in their entirety. However, RFC 4091 and RFC 4092 deal with interoperability with systems that both support ANAT. RFC 4091 and RFC 4092 do not fully address IP version interoperability with legacy devices that do not support ANAT. As a result, attempts to establish a media stream using SDP between an ANAT compatible device and a legacy device that does not support ANAT is problematic at best—typically resulting in a connection failure, which is not an acceptable option. In addition, connection failures may occur in SDP negotiations between communication entities that support different IP versions. What is needed is a solution that can provide interoperability between ANAT devices and legacy devices that do not support ANAT.

SUMMARY

These and other needs are addressed by the various embodiments and configurations of the present disclosure. To deal with ANAT/IP version incompatibility, a communication endpoint registers with a communication system using a SIP REGISTER message. For example, the communication endpoint registers when it boots up. The SIP REGISTER message indicates that the communication endpoint: does not support the Alternative Network Address Type (ANAT) protocol or is one of Internet Protocol Version 4 (IPV4) intolerant or Internet Protocol Version 6 (IPV6) intolerant. When a SIP INVITE message is received with a Session Description Protocol (SDP) offer that contains the ANAT protocol or an IP address that is opposite of the IP version tolerance of the communication endpoint, a 4XX SIP response message is sent to the sender of the SIP INVITE to indicate the incompatibility. In response to receiving the 4XX SIP response message, the SIP INVITE is modified to be compatible with the capabilities of the communication endpoint.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
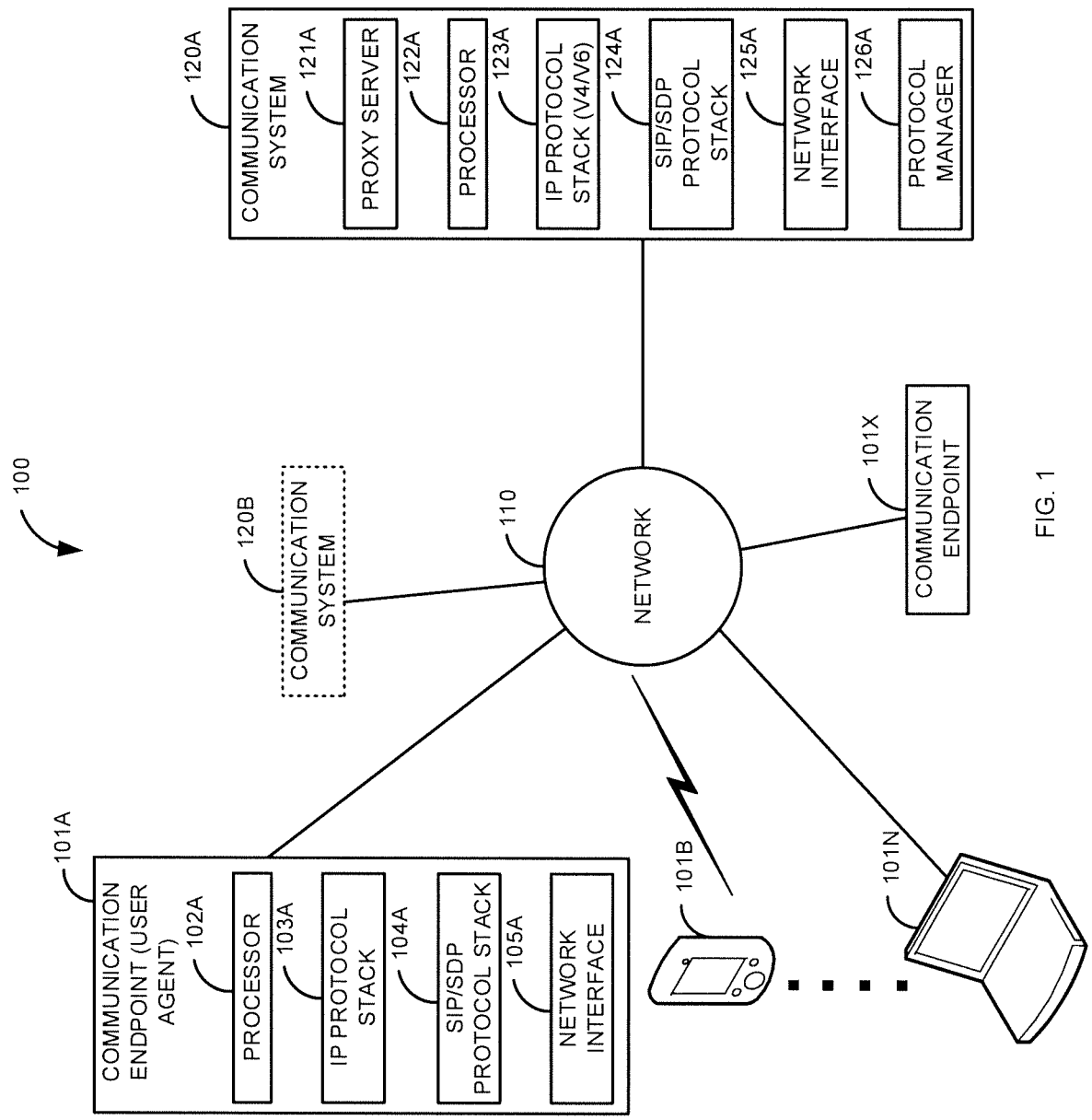
FIG. 1 is an illustrative block diagram of a first illustrative system for dealing with Session Description Protocol (SDP) compatibility issues with different Internet Protocol (IP) versions.

FIG. 1 is an illustrative block diagram of a first illustrative system 100 for dealing with Session Description Protocol (SDP) compatibility issues with different Internet Protocol (IP) versions. The first illustrative system 100 comprises communication endpoints 101A-101N, a communication endpoint 101X, network 110, and communication systems 120A-120B.

The communication endpoints 101A-101N/101X can be or may include any communication endpoint 101 device that can communicate on the network 110, such as a Personal Computer (PC), a telephone, a video system, a cellular telephone, a Personal Digital Assistant (PDA), a tablet device, a notebook device, a web server, a media server, a smart phone, a recording device, and/or the like. The communication endpoints 101A-101N/101X are devices where a communication sessions ends. The communication endpoints 101A-101N/101X are not network elements that facilitate and/or relay a communication session in the network 110, such as the communication system 120 or the proxy server 121. As shown in FIG. 1, any number of communication endpoints 101A-101N/101X may be connected to the network 110. In one embodiment, the communication endpoints 101A-101N/101X may be Session Initiation Protocol (SIP) User Agents (SIP UAs).

The communication endpoint 101A further comprises a processor 102A, an IP protocol stack 103A, a Session Initiation Protocol (SIP)/Session Description Protocol (SDP) stack 104A, and network interface 105A. Although not shown, the communication endpoints 101B-101N/101X may also comprise the elements 102-103 in a similar configuration to the communication endpoint 101A.

The processor 102A can be or may include any hardware processor, such as a microprocessor, a microcontroller, a Digital Signaling Processor (DSP), an application specific processor, a multi-core processor, and/or the like. The processor 102A can process software/firmware instructions to implement the processes described herein for the communication endpoints 101A.

The IP protocol stack 103A can be or may include any firmware/software that can be used to support the Internet Protocol (IP). The IP protocol stack 103A may support any version of IP, such as IPV4, IPV6, and/or the like.

The SIP/SDP protocol stack 104A can be or may include any firmware/software that can be used to support SIP and SDP along with other protocol stacks. For example, the communication endpoint 101A may also support SIP, H.323, Web Real-Time Communication (WebRTC) protocol, and/or the like. The SIP/SDP protocol stack 104A may support the Alternative Network Address Type (ANAT) protocol, which is an extension to SIP.

The network interface 105A can be or may include any hardware interface that allows the communication endpoint 101A to communicate on the network 110, such as an Ethernet interface, a WiFi interface, a cellular interface, a fiber optic interface, a wireless interface, a wired interface, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocols, WebRTC, Integrated Services Digital Network (ISDN), and the like. Thus, the network 110 is an electronic communication network configured to carry messages via packets and/or circuit switched communications.

The communication systems 120A-120B can be or may include any hardware system coupled with software/firmware that can manage communications on the network 110, such as a communication manager, a session manager, a Private Branch Exchange (PBX), a router, a switch, a proxy server 121A, a central office switch, and/or the like. In FIG. 1, the communication systems 120A-120B are shown on the same network 110. The communication system 120A further comprises the proxy server 121A, a processor 122A, an IP protocol stack 123A, a SIP/SDP protocol stack 124A, a network interface 125A, and a protocol manager 126A. Although not shown, the communication system 120B may also comprises the same elements 121-126. Alternatively, the communication system 120B may comprise a subset of the elements 121A-126A.

The proxy server 121A can be or may include any proxy server 121 that can manage communication sessions between the communication endpoints 101A-101N/101X. In one embodiment, the proxy server 121A may be a SIP proxy server. The SIP proxy server 121A may manage a SIP communication session between two or more communication endpoints 101.

The processor 122A can be or may include any hardware processor. For example, the processor 122A may be the same or similar to the processor 102A.

The IP protocol stack 123A can be the same or different from the IP protocol stack 103A in the communication endpoint 101A. For example, the IP protocol stack 123A may support both IPV4 and IPV6 while the IP protocol stack 103A may only support one or both of IPV4/IPV6.

The SIP/SDP protocol stack 124A can be the same or different from the SIP/SDP protocol stack 104A. For example, the SIP/SDP protocol stack 124A may be a multi-threaded protocol stack that can support multiple communication endpoints 101A-101N/101X.

The network interface 125A may be the same or different from the network interface 105A. The network interface 125A may comprise multiple network interfaces. For example, the network interface 125A may comprise a WiFi and an Ethernet interface.

The protocol manager 126A can be or may include any firmware/software that can manage different versions IP, SIP, SDP, ANAT and various protocols, such as H.323, WebRTC, video protocols, Instant Messaging (IM) protocols, and/or the like. For example, the protocol manager 126 can swap between IPV4 and IPV6 (or between IPV6 and IPV4) addressing to provide IP interoperability at the network layer and at the application layer (e.g., in SIP/SDP etc.).

Figure 2:
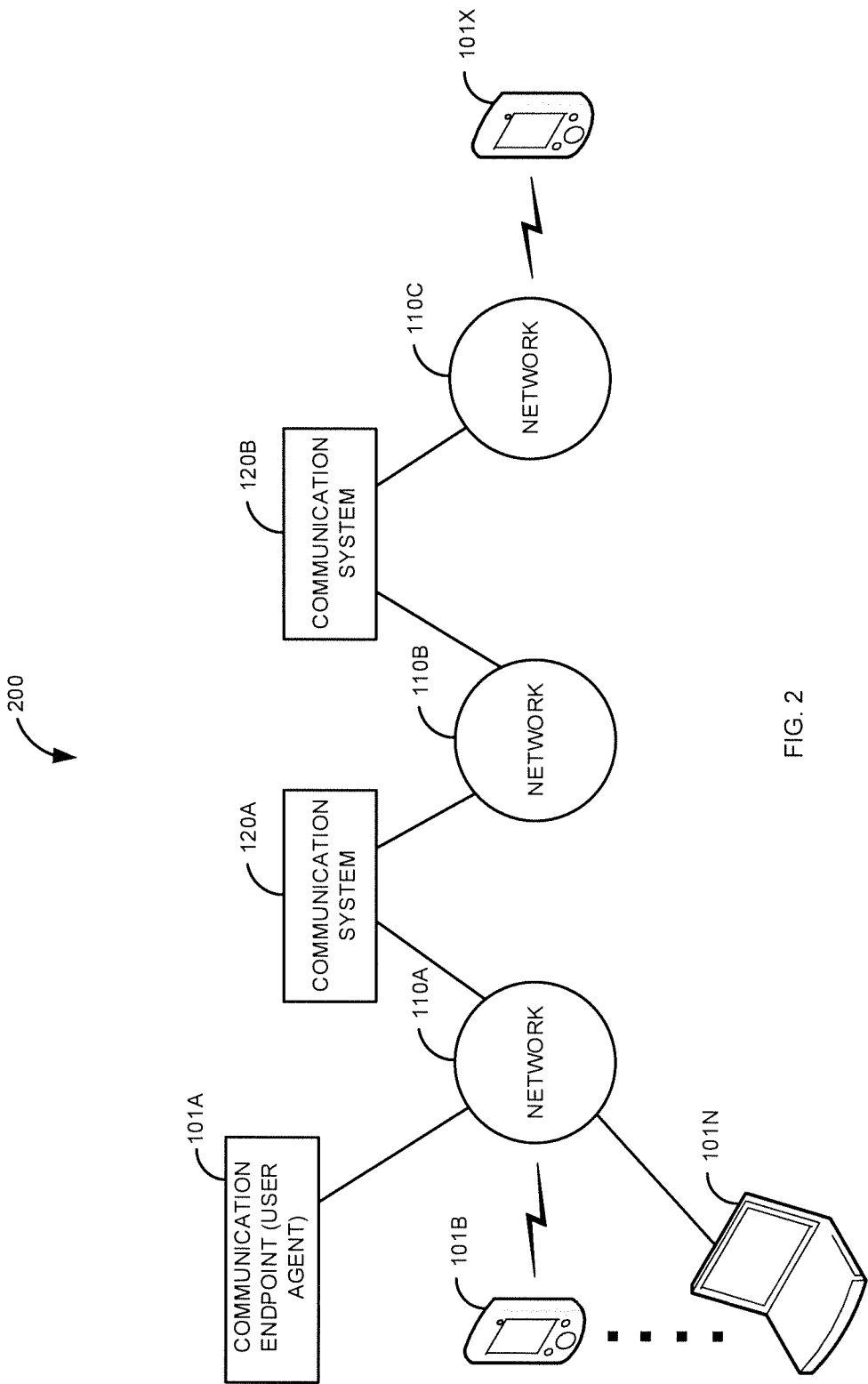
FIG. 2 is an illustrative block diagram of a second illustrative system for dealing with Session Description Protocol (SDP) compatibility issues with different Internet Protocol (IP) versions.

FIG. 2 is an illustrative block diagram of a second illustrative system 200 for dealing with Session Description Protocol (SDP) compatibility issues with different Internet Protocol (IP) versions. The second illustrative system 200 comprises the communication endpoints 101A-101N, the communication endpoint 101X, networks 110A-110C, and the communication systems 120A-120B. FIG. 2 is an illustrative example of where communication systems 120A-120B may be distributed across the networks 110A-110C. For example, the network 110B may be the Internet and the networks 110A and 110C may be corporate networks. In FIG. 2, a communication session may be established between the communication endpoint 101X and the communication endpoints 101A-101N via the communication systems 120A-120B.

Figure 3:
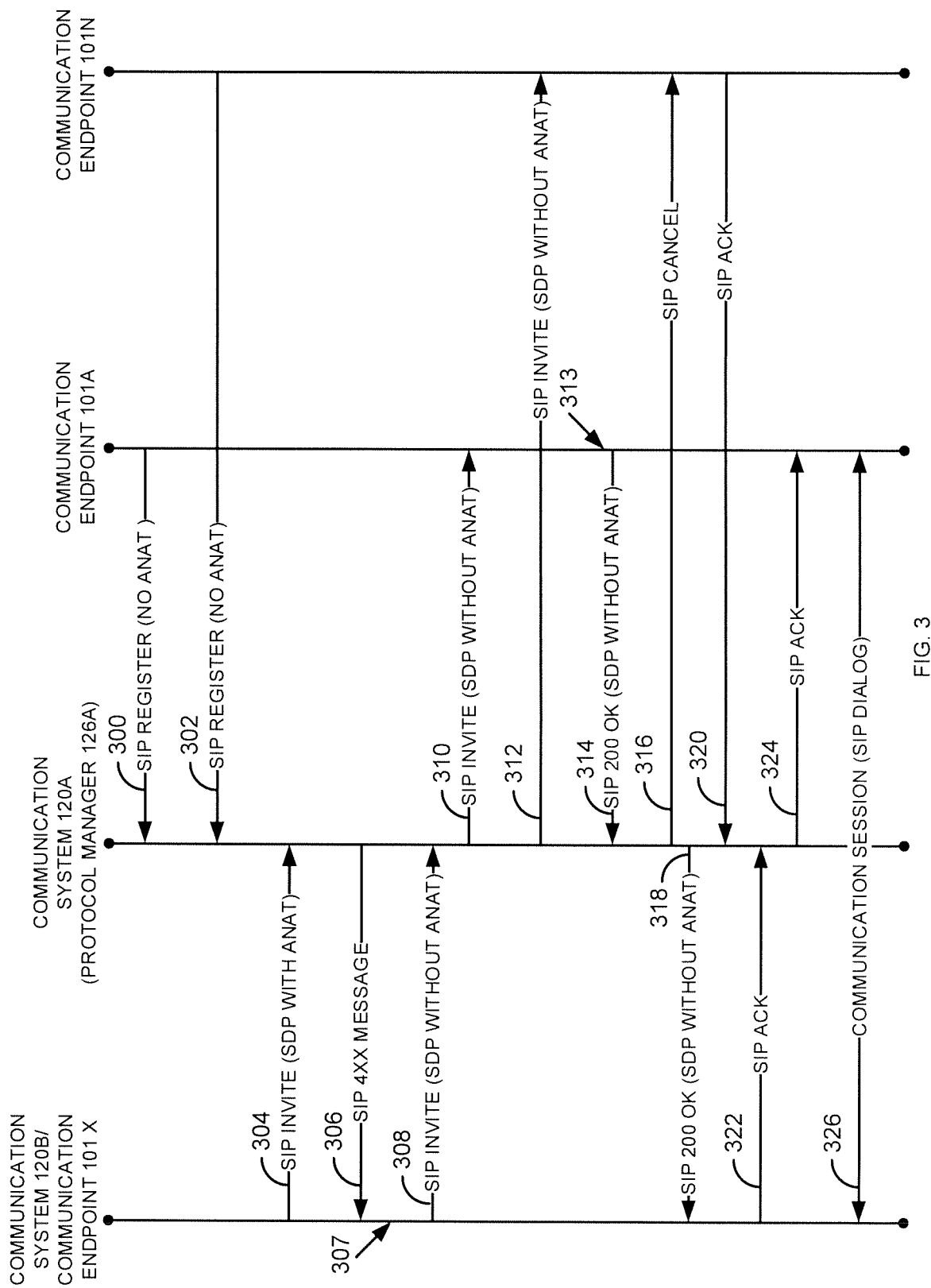
FIG. 3 is a flow diagram of a process for dealing with Alternative Network Address Type (ANAT) incompatibility.
Figure 4:
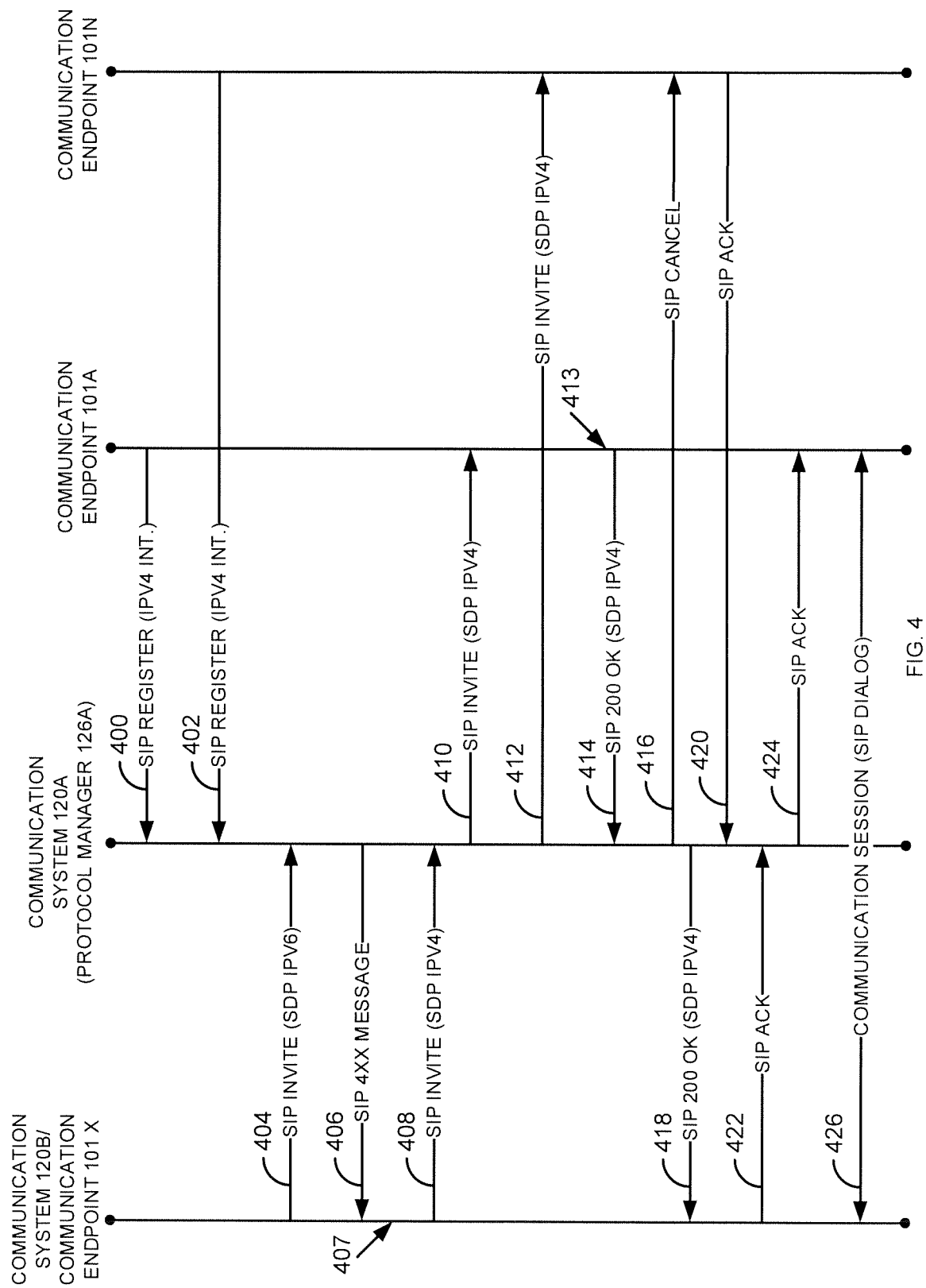
FIG. 4 is a flow diagram of a process for dealing with IP version intolerance in the Session Description Protocol (SDP).
Figure 5:
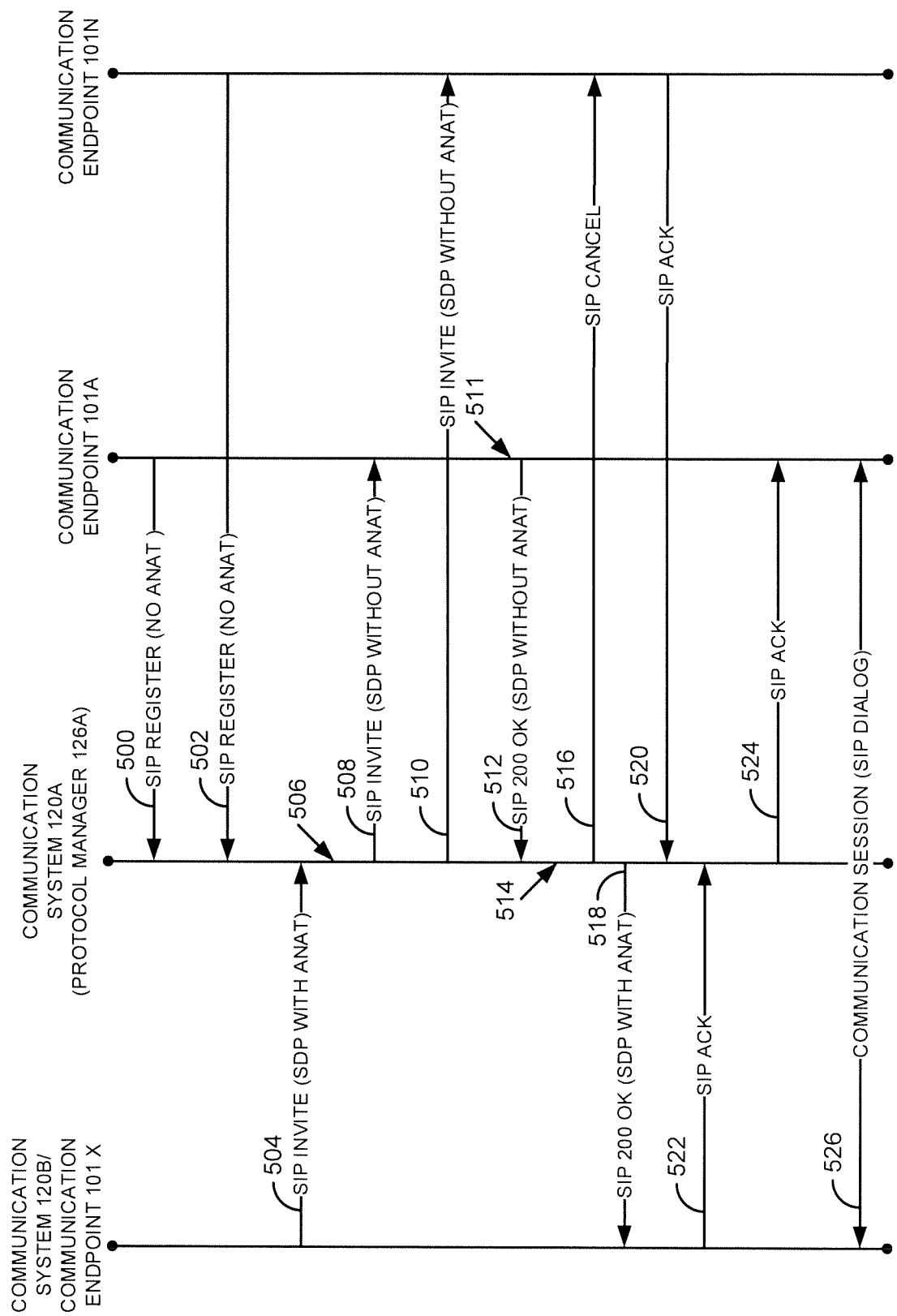
FIG. 5 is a flow diagram of a process for dealing with Alternative Network Address Type (ANAT) incompatibility.

FIG. 3 is a flow diagram of a process for dealing with Alternative Network Address Types (ANAT) incompatibility. Illustratively, the communication endpoints 101A-101N/101X, the IP protocol stacks 103/123, the SIP/SDP protocol stacks 104/124, the network interfaces 105/125, the communication systems 120A-120B, the proxy server 121, and the protocol manager 126, are stored-program-controlled entities, such as a computer or microprocessor, which performs the method of FIGS. 3-5 and the processes described herein by executing program instructions stored in a hardware computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

In FIGS. 3-5, each of the flow diagrams have the communication manager 120A/protocol manager 126A involved in various steps. The protocol manager 126A processes/modifies/changes the messages discussed in FIGS. 3-5 that are received from the network interface 125A by using the IP protocol stack 123A and the SIP/SDP protocol stack 124A. The communication system 120A may also use proxy server 121 to forward messages. In addition, the processor 102, the IP protocol stack 103, the SIP/SDP protocol stack 104, and the network interface 105 can be used to send, receive, and process any of the communication endpoint messages discussed herein.

The process of FIG. 3-5 are illustrated using the Session Initiation Protocol (SIP). SIP is a standard protocol that is well known in the field of telecommunications. FIGS. 3-5 disclose the use of many of the standard SIP messages (e.g., a SIP INVITE message, a SIP REGISTER message, etc.), which are defined in Network Working Group RFC 3261 "SIP: Session Initiation Protocol" June, 2002, which is incorporated herein in its entirety by reference. In addition, FIGS. 3-4 disclose the use of various 4XX SIP response messages that are defined the SIP RFC 3261 and/or other SIP RFCs.

FIGS. 3-5 also discuss the use of the Session Description Protocol (SDP). The Session Description Protocol (SDP) is a standard networking protocol that is used to negotiate establishment of a media stream (e.g., a voice or video media stream) for a communication session. SDP typically is used to negotiate a media stream using Real-time Transport Protocol (RTP). A description of standard SDP messaging can be found in Network Working Group "SDP: Session Description Protocol," July, 2006, which is incorporated herein in its entirety by reference. As discussed in the Background section, SDP uses IP addressing that may support one or more of IPV4 or IPV6.

When referring to whether a communication system 120/communication endpoint 101 is compatible/incompatible with each other in regard to IP addressing, the terms IP version tolerant or IP version intolerant are used. If a communication system 120 or communication endpoint 101 is IP intolerant, in order to be compatible, different messaging and/or IP address adaption is necessary. For discussion herein, the following definitions are used to define whether a communication system 120 and/or a communication endpoint 101 is IP version tolerant/intolerant.

IPV4 Intolerant these communication systems 120/communication endpoints 101 can accept and generate IPV4 addresses in the SDP over IPV4 connections. IPV4 intolerant devices cannot send/receive SDP messages containing IPV6 addressing.

IPV6 Intolerant these communication systems 120/communication endpoints 101 can accept and generate IPV6 addresses only in the SDP over IPV6 connections. IPV6 intolerant devices cannot send/receive messages containing IPV4 addressing.

IPV4 Tolerant: in addition to the IPV4 addresses, these communication systems 120/communication endpoints 101 can accept and generate IPV6 addresses in the SDP over IPV4 connections.

IPV6 Tolerant: in addition to the IPV6 addresses, these communication systems 120/communication endpoints 101 can accept and generate IPV4 addresses in the SDP over IPV6 connections.

IPV46 Intolerant: these communication systems 120/communication endpoints 101 support both IPV4 and IPV6 addresses: these communication systems 120/communication endpoints 101 can accept and generate only IPV4 addresses in the SDP over IPV4 connections; and, only IPV6 addresses in the SDP over IPV6 connections.

IPV46 Tolerant: these communication systems 120/communication endpoints 101 support both IPv4 and IPV6 addresses in the SDP: they can accept and generate IPv4 addresses in the SDP over IPV6 connections; and, IPV6 addresses in the SDP, over IPV4 connections.

In addition, FIGS. 3 and 5 discuss the use of SDP in conjunction with Alternative Network Address Types (ANAT) that may be included in the SDP. As discussed above, the use of ANAT is described in RFCs 4091 and 4092. Below, in Table 1, is an exemplary description of two SDP offers (using Real-Time Communication Protocol (RTP)). The first SDP offer (on the left side of Table 1) is an exemplary SDP offer that has ANAT encoding. The ANAT encoding (a=group:ANAT 1 2, a=mid:1, m=audio 5000 RTP/AVP 0 18 120, c=IN IP6 2a07:2a41:ad07:11f1::421, a=sendrecv, a=fmtp:18 annexb=no, a=rtpmap:120 telephone-event/8000, and a=mid:2) is used to identify that the communication device making the SDP offer can support either IPV4 addressing (c=IN IP4 135.9.237.176) or IPV6 addressing (c=IN IP6 2a07:2a41:ad07:11f1::421) in a response to the SDP offer.

In other embodiments, the SDP offer may include a header that has an ANAT option registration tag. For example, the ANAT option registration tag may look like "Require" sdp-anat" or "Supported: sdp-anat." In one embodiment the SDP offer may contain both the ANAT encoding and ANAT option registration tag.

The second SDP offer (on the right side of Table 1) is a non-ANAT SDP offer. For the non-ANAT SDP offer, the originating communication system 120 or communication endpoint 101, only supports IPV4, which may indicate that the originating communication system 120 or communication endpoint 101 is IPV4 intolerant.

TABLE 1

| SDP Offer 1-ANAT SDP Offer - SDP Offer 1 | Non-ANAT SDP Offer (IPv4 intolerant) - SDP Offer 2 |
| --- | --- |
| v=0 | v=0 |
| o=- 1491944195 1 IN IP4 10.129.177.102 | o=- 1491944195 1 IN IP4 10.129.177.102 |
| s=- | s=- |
| c=IN IP4 135.9.237.176 | c=IN IP4 135.9.237.176 |
| b=TIAS:64000 | b=TIAS:64000 |
| t=0 0 | t=0 0 |
| a=group:ANAT 1 2 | m=audio 5000 RTP/AVP 0 18 120 |
| m=audio 5000 RTP/AVP 0 18 120 | c=IN IP4 135.9.237.176 |
| c=IN IP4 135.9.237.176 | a=sendrecv |
| a=sendrecv | a=fmtp:18 annexb=no |
| a=fmtp:18 annexb=no | a=rtpmap:120 telephone-event/ 8000 |
| a=rtpmap:120 telephone-event/8000 | |
| a=mid:1 | |
| m=audio 5000 RTP/AVP 0 18 120 | |
| c=IN IP6 2a07:2a41:ad07:11f1::421 | |
| a=sendrecv | |
| a=fmtp:18 annexb=no | |
| a=rtpmap:120 telephone-event/8000 | |
| a=mid:2 | |

The process of FIG. 3 starts in step 300 when the communication endpoint 101A sends a SIP REGISTER message to the communication system 120A. The SIP REGISTER message of step 300 indicates that the communication endpoint 101A does not support ANAT messaging. For example, the communication endpoint 101A cannot accept the SDP offer 1 in Table 1. The communication endpoint 101N, in step 302, may also send a SIP REGISTER message to the communication system 120A. The SIP REGISTER message of step 302 indicates that the communication endpoint 101N does not support ANAT messaging.

The communication system 120B or the communication endpoint 101X sends, in step 304, a SIP INVITE message with ANAT in a SDP offer to the communication system 120A. For example, the SDP offer with ANAT may be similar to the SDP Offer 1 in Table 1. The SDP offer in the SIP INVITE message of step 304 may contain the ANAT option registration tag and/or the ANAT encoding as discussed above.

The SIP INVITE message of step 304 may be used for establishing a SIP communication session (e.g., a voice call) with the communication endpoint 101A (e.g., using a telephone number). Alternatively, instead of a telephone number, the SIP INVITE message of step 304 may contain a Uniform Resource Identifier (URI) that identifies a user (e.g., doug@xyz.com). The URI is an address of record for the user that may be associated with one or more communication endpoints 101. For example, the SIP INVITE message may have the URI doug@xyz.com, which is associated with the communication endpoint 101A and 101N of the user doug@xyz.com.

In one embodiment of FIG. 3, the SIP INVITE message of step 304 may come directly from the communication endpoint 101X. For example, as shown in FIG. 1, the communication endpoint 101X may send the SIP INVITE message of step 304 directly to the communication system 120A via the network 110. Alternatively, in FIG. 1, the communication endpoint 101X may send a SIP INVITE message to the communication system 120B, which in turns sends the SIP INVITE message of step 304 to the communication system 120A.

In addition, as shown in FIG. 2, the communication endpoint 101X may send a SIP INVITE message to the communication system 120B, which in turn sends the SIP INVITE message of step 304 to the communication system 120A. When discussing the communication endpoint 101X/communication system 120B in FIG. 3, each of the above embodiments work interchangeably. Likewise, for FIGS. 4-5, when discussing the communication endpoint 101X/communication system 120B, each of the above embodiments also work interchangeably.

In response to the SIP INVITE message of step 304 containing the ANAT protocol in the SDP offer, the communication system 120B sends, in step 306, a 4XX SIP response message to the communication endpoint 101X or the communication system 120B (the originator). The SIP 4XX message of step 306 may be any of the standard 4XX SIP response messages defined in SIP. For example, the SIP message of step 306 may be a SIP 400 BAD REQUEST message, a SIP 401 UNAUTHORIZED message, a SIP 405 METHOD NOT ALLOWED message, a SIP 406 NOT ACCEPTABLE message, a SIP 409 CONFLICT message, a SIP 412 CONDITIONAL REQUEST FAILED message, a SIP 420 BAD EXTENSION message, a SIP 421 EXTENSION REQUIRED message, a SIP 470 CONSENT NEEDED message, a SIP 480 TEMPORARILY UNAVAILABLE message, a SIP 481 CALL/TRANSACTION DOES NOT EXIST message, a SIP 485 AMBIGUOUS message, a SIP 486 BUSY message, a SIP 488 NOT ACCEPTABLE HERE message, a SIP 489 BAD EVENT message, or the like. In one embodiment, the 4XX SIP response message of step 306 is a SIP 420 BAD EXTENSION message.

In response to receiving the 4XX SIP response message of step 306, the communication system 120B/communication endpoint 101X modifies, in step 307, the SIP INVITE message of step 306 by removing the ANAT lines and/or ANAT option registration tag(s) in the SDP offer (those lines that are highlighted in Table 1). If the communication system 120B receives the 4XX SIP response message of step 306, the communication system 120B can then re-issue the SIP INVITE message of step 304 to the SIP INVITE message of step 308 by renegotiating the SDP offer. The advantage of this approach is that the communication endpoint 101X does not have to know how to respond to the SIP 4XX message of step 306. In other words, the communication endpoint 101X does not have to be updated or replaced to be backward compatible.

The communication system 120B/communication endpoint 101X sends, in step 308, the modified SIP INVITE message without ANAT in the SDP offer to the communication system 120A. The communication system 120A forwards the SIP INVITE message of step 308 without ANAT in the SDP offer to the communication endpoint 101A in step 310. For example, if the SIP INVITE message of step 308 uses the telephone number of the communication endpoint 101A.

In addition, the communication system 120A may also forward the SIP INVITE message (of step 308) without ANAT in the SDP offer to the communication endpoint 101N in step 312. For example, if the SIP INVITE message of step 308 used an address of record (e.g., doug@xyz.com) for the user that was associated with the communication endpoints 101A and 101N. If there are multiple communication endpoints 101 associated with the address of record, the SIP INVITE message is forked, by the communication system 120A, to the communication endpoints 101A and 101N in steps 310 and 312.

A user answers the call (e.g., picks up the phone) on the communication endpoint 101A in step 313. In response, the communication endpoint 101A sends, in step 314, a SIP 200 OK message without ANAT in a SDP response. The communication system 120A forwards, in step 318, the SIP 200 OK message without ANAT in the SDP response to the communication endpoint 101X/communication system 120B. If the communication system 120B receives the SIP 200 OK without ANAT in step 318, the communication system 120B modifies the SIP 200 OK to have ANAT. The modified SIP 200 OK with ANAT is then sent to the communication endpoint 101X. This way the communication endpoint 101X does not have to be replaced or updated to be backward compatible.

In response, the communication endpoint 101X/communication system 120B sends a SIP ACK message to the communication system 120A. The communication system 120A forwards, in step 324, the SIP ACK message of step 322 to the communication endpoint 101N. At this point, a communication session (a RTP media stream) may be established between the communication endpoint 101X and the communication endpoint 101A in step 326.

If call forking has been invoked for an address of record and the SIP INVITE message of step 312 was sent, the communication system 120A sends, in step 316, a SIP CANCEL message to the communication endpoint 101N to cancel the SIP INVITE message of step 312 because the forked call was answered at the communication endpoint 101A (in step 313). The communication endpoint 101N sends, in step 320, a SIP ACK message to acknowledge the SIP CANCEL message of step 316.

In FIG. 3, the SIP REGISTER messages of steps 300 and 302 may indicate that the communication endpoints 101A and 101N both support ANAT. In this case, the SIP INVITE message of step 304 would be forwarded with the ANAT in steps 310 and 312. Steps 306 and 308 would not be performed and the messages of steps 310, 312, 314, and 318 would have ANAT in the SDP offers and responses.

If the SIP REGISTER message of step 300 indicates no support for ANAT and the SIP REGISTER message of step 302 indicates support for ANAT for an address of record associated with the communication endpoints 101A and 101N, in one embodiment, the SIP INVITE message with ANAT of step 304 would only be forwarded to the communication endpoint 101N (that supports ANAT). There would be no forking of the SIP INVITE message of step 310 to communication endpoint 101A. Alternatively (where only the communication endpoint 101N that supports ANAT), the 4XX SIP response message of step 306 may be sent and the SIP INVITE message without ANAT in the SDP offer of step 308 would be sent without ANAT. The communication endpoint 101N (that supports ANAT) would be able to handle the non-ANAT SIP INVITE message of step 312.

FIG. 4 is a flow diagram of a process for dealing with IP version intolerance in the Session Description Protocol (SDP). The process of FIG. 4 starts, in step 400, where the communication endpoint 101A sends a SIP REGISTER message to the communication system 120A. The SIP REGISTER message of step 400 indicates that the communication endpoint 101A is IPV4 intolerant. The communication endpoint 101N sends, in step 402 a SIP REGISTER message that indicates that the communication endpoint 101N is also IPV4 intolerant. Since the communication endpoints 101A/101N are both IPV4 intolerant, the communication endpoints 101A/101N cannot understand a SDP offer with IPV6 addressing (e.g., the "c=IN IP6 2a07:2a41:ad07:11f1::421" line of the SDP Offer 1 in Table 1). In other words, the communication endpoints 101A/101N require IP addresses in the SDP offer that are 32 bits long per the IPV4 standard. If IP an address that is 128 bits long is received in the SDP offer, the communication endpoints 101A/101N will not know how to handle the longer addresses of IPV6. Similarly, if the communication endpoints 101A/101N are IPV6 intolerant, any SDP offers that contain IPV4 addresses would not be understood by the communication endpoints 101A/101N. In FIGS. 3 and 4, the SIP REGISTER messages 300, 302, 400, and 402 discuss registration of IP intolerance. However, one of skill in the art would understand that the SIP REGISTER messages 300, 302, 400, and 402 may identify which IP version a communication endpoint 101 may tolerate. For example, if a communication endpoint 101 sends a SIP REGISTER message that the communication endpoint is only IPV4 tolerant, this would be the same as the communication endpoint 101 registering that it is IPV6 intolerant. Likewise, if a communication endpoint 101 sends a SIP REGISTER message that the communication endpoint is IPV6 tolerant, this would be the same as the communication endpoint 101 registering that it is IPV4 intolerant. In the claims, the use registration for IP version intolerance also covers the above registration of IP tolerance.

The communication system 120B/communication endpoint 101X sends, in step 404, a SIP INVITE message that supports IPV6 in the SDP offer. Because the communication endpoints 101A and 101N are IPV4 intolerant for SDP messaging and the SIP INVITE message of step 404 has a SDP offer with IPV6 addressing, the communication system 120A sends, in step 406, a 4XX SIP response message to the communication endpoint 101X/communication system 120B. For example, the SIP message of step 406 may be a SIP 400 BAD REQUEST message, a SIP 401 UNAUTHORIZED message, a SIP 405 METHOD NOT ALLOWED message, a SIP 406 NOT ACCEPTABLE message, a SIP 409 CONFLICT message, a SIP 412 CONDITIONAL REQUEST FAILED message, a SIP 420 BAD EXTENSION message, a SIP 421 EXTENSION REQUIRED message, a SIP 470 CONSENT NEEDED message, a SIP 480 TEMPORARILY UNAVAILABLE message, a SIP 481 CALL/TRANSACTION DOES NOT EXIST message, a SIP 485 AMBIGUOUS message, a SIP 486 BUSY message, a SIP 488 NOT ACCEPTABLE HERE message, a SIP 489 BAD EVENT message, or the like. In one embodiment, the 4XX SIP response message of step 406 is a SIP 488 NOT ACCEPTABLE HERE message.

In response to receiving the 4XX SIP response message of step 406, the communication system 120B/communication endpoint 101 modifies, in step 407, the SIP INVITE message of step 406 by replacing the IPV6 address with an IPV4 address (e.g., an IPV4 address of the communication system 120B/communication endpoint 101X). If the communication system 120B receives the 4XX SIP response message of step 406, the communication system 120B can then re-issue the SIP INVITE message of step 404 to the SIP INVITE message of step 408 by modifying the SDP IPV6 information to SDP IPV4 information. The advantage of this approach is that the communication endpoint 101X does not have to know how to respond to the SIP 4XX message of step 406. In other words, the communication endpoint 101X does not have to be updated or replaced to be backward compatible.

The communication endpoint 101X/communication system 120B sends, in step 408, the modified SIP INVITE message with a SDP offer that only contains IPV4 addressing. The communication system 120A forwards, in step 410, the SIP INVITE message with the IPV4 address in the SDP offer to the communication endpoint 101A. If forking is invoked (an address of record with multiple communication endpoints 101A and 101N), the communication system 120A forwards, in step 412, the SIP INVITE message with the SDP offer with the IPV4 address to the communication endpoint 101N.

A user answers the call (e.g., picks up the phone) on the communication endpoint 101A in step 413. In response, the communication endpoint 101A sends, in step 414, a SIP 200 OK message with a SDP response with the IPV4 address. The communication system 120A forwards, in step 418, the SIP 200 OK message with the SDP response with the IPV4 address to the communication endpoint 101X/communication system 120B. If the communication system 120B receives the SIP 200 OK with SDP IPV4 information in step 418, the communication system 120B modifies the SDP in the SIP 200 OK to IPV6. The modified SIP 200 OK with IPV6 SDP is then sent to the communication endpoint 101X. This way the communication endpoint 101X does not have to be replaced or updated to be backward compatible.

In response, the communication endpoint 101X/communication system 120B sends, in step 422, a SIP ACK message to the communication system 120A. The communication system 120A forwards, in step 424, the SIP ACK message to the communication endpoint 101N. At this point, a communication session (e.g., a RTCP media stream) may be established between the communication endpoint 101X and the communication endpoint 101A in step 426.

If call forking has been invoked for an address of record and the SIP INVITE message of step 412 was sent, the communication system 120A sends, in step 416, a SIP CANCEL message to the communication endpoint 101N to cancel the SIP INVITE message of step 412 because the forked call was answered at the communication endpoint 101A (in step 413). The communication endpoint 101N sends, in step 420, a SIP ACK message to acknowledge the SIP CANCEL message of step 416.

In FIG. 4, the IP version intolerance of the communication endpoints 101A and 101N are shown as IPV4 intolerant and the SDP offer in the SIP INVITE message of step 404 requires IPV6. The description of FIG. 4 will also work where the communication endpoints 101A and 101N register as IPV6 intolerant and the SIP INVITE message is IPV4.

FIG. 5 is a flow diagram of a process for dealing with Alternative Network Address Types (ANAT) incompatibility. The process of FIG. 5 starts in step 500 when the communication endpoint 101A sends a SIP REGISTER message to the communication system 120A. The SIP REGISTER message of step 500 indicates that the communication endpoint 101A does not support ANAT messaging. For example, the communication endpoint 101A cannot accept the SDP offer 1 in Table 1. The communication endpoint 101N, in step 502, may also send a SIP REGISTER message to the communication system 120A. The SIP REGISTER message of step 502 indicates that the communication endpoint 101N does not support ANAT messaging.

The communication endpoint 101X/communication system 120B sends, in step 504, a SIP INVITE message that has a SDP offer with ANAT. The ANAT in the SDP offer of the SIP INVITE message of step 504 may have the ANAT encoding and/or the ANAT option registration tag(s). In response to receiving the SIP INVITE message with ANAT in the SDP offer (step 504) and the communication endpoint 101A (and communication endpoint 101N if an address of record is used) not supporting ANAT, the communication system 120A, in step 506, changes the SIP INVITE message of step 504 by removing the ANAT encoding and/or the ANAT option registration tag(s) so there is no ANAT fields in the changed SIP INVITE. For example, the communication system 120A can change the ANAT option registration tag/encoding like in the SDP Offer 1 of Table 1 to look like the SDP Offer 2 of Table 1. The communication system 120A sends, in step 508, the changed SIP INVITE message without ANAT to the communication endpoint 101A.

In addition, the communication system 120A may also send the changed SIP INVITE message (of step 506) without ANAT in the SDP offer to the communication endpoint 101N in step 510. For example, if the SIP INVITE message of step 504 used an address of record (e.g., doug@xyz.com) for the user that was associated with the communication endpoints 101A and 101N. If there are multiple communication endpoints associated with the address of record, the SIP INVITE message is forked, by the communication system 120A, to the communication endpoints 101A and 101N in steps 508 and 510.

A user answers the call (e.g., picks up the phone) on the communication endpoint 101A in step 511. In response, the communication endpoint 101A sends, in step 512, a SIP 200 OK message without ANAT in a SDP response. The communication system 120A, in step 514, modifies the SDP response in the SIP 200 OK message of step 512 by adding the ANAT encoding and/or ANAT option registration tag back into the SDP response.

The communication system 120A sends, in step 518, the modified SIP 200 OK message with ANAT in the SDP response to the communication endpoint 101X/communication system 120B. In response, the communication endpoint 101X/communication system 120B sends, in step 522, a SIP ACK message to the communication system 120A. The communication system 120A forwards, in step 524, the SIP ACK message of step 522 to the communication endpoint 101N. At this point, a communication session (e.g., a RTCP media stream) may be established between the communication endpoint 101X and the communication endpoint 101A in step 526.

If call forking has been invoked for an address of record and the SIP INVITE message of step 510 was sent, the communication system 120A sends, in step 516, a SIP CANCEL message to the communication endpoint 101N to cancel the SIP INVITE message of step 510 because the forked call was answered at the communication endpoint 101A (in step 511). The communication endpoint 101N sends, in step 520, a SIP ACK message to acknowledge the SIP CANCEL message of step 516.

In addition to not supporting ANAT, the SIP REGISTER messages of steps 502 and 504 may also indicate a type of IP version intolerance. For example, the SIP REGISTER message of step 500 may indicate that the communication endpoint 101A does not support ANAT and is IPV6 intolerant. When the communication system 120A changes the SIP INVITE from ANAT to non-ANAT in step 506, the communication system 120A may also change the IP addressing from IPV6 to IPV4 (or visa versa when necessary). Likewise, in step 514, the changes will be reverse (e.g., from IPV4 to IPV6 addresses).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
receiving, by a microprocessor and from a first communication endpoint, a first SIP REGISTER message, wherein the first SIP REGISTER message indicates that the first communication endpoint does not support an Alternative Network Address Type (ANAT);
receiving, by the microprocessor, a first SIP INVITE message directed toward the first communication endpoint with a first Session Description Protocol (SDP) offer that comprises an ANAT encoding and/or an ANAT option registration tag;
in response to receiving the first SIP INVITE message directed toward the first communication endpoint with the SDP offer that comprises the ANAT encoding and/or the ANAT option registration tag, sending a 4XX SIP response message.

2. The method of claim 1, wherein the SDP offer in the first SIP INVITE message comprises the ANAT encoding.

3. The method of claim 1, further comprising:
receiving, a second SIP INVITE message with a second SDP offer that does not comprise the ANAT encoding or the ANAT option registration tag; and
in response to receiving the second SIP INVITE message with the second SDP offer that does not comprise the ANAT encoding or the ANAT option registration tag, forwarding the second SIP INVITE message to the first communication endpoint.

4. The method of claim 3, further comprising:
receiving, from a second communication endpoint, a second SIP REGISTER message that indicates that the second communication endpoint does not support the ANAT, wherein the first communication endpoint and the second communication endpoint are associated with an address of record of a user; and
in response to receiving the second SIP INVITE message with the second SDP offer that does not comprise the ANAT encoding or the ANAT option registration tag, forwarding the second SIP INVITE message to the second communication endpoint.

5. The method of claim 1, wherein the SDP offer in the first SIP INVITE message comprises the ANAT option registration tag.

6. The method of claim 1, wherein the 4XX SIP response message comprises a SIP 420 BAD EXTENSION message.

7. The method of claim 1, further comprising:
receiving, from a second communication endpoint, a SIP 200 OK message with a second SDP offer that does not comprise the ANAT encoding.

8. The method of claim 1, wherein 4XX SIP response message is one of: a SIP 400 BAD REQUEST message, a SIP 401 UNAUTHORIZED message, a SIP 405 METHOD NOT ALLOWED message, a SIP 406 NOT ACCEPTABLE message, a SIP 409 CONFLICT message, a SIP 412 CONDITIONAL REQUEST FAILED message, a SIP 420 BAD EXTENSION message, a SIP 421 EXTENSION REQUIRED message, a SIP 470 CONSENT NEEDED message, a SIP 480 TEMPORARILY UNAVAILABLE message, a SIP 481 CALL/TRANSACTION DOES NOT EXIST message, a SIP 485 AMBIGUOUS message, a SIP 486 BUSY message, a SIP 488 NOT ACCEPTABLE HERE message, or a SIP 489 BAD EVENT message.

9. A system comprising:
a microprocessor; and
a computer readable non-transitory medium, coupled with the microprocessor and comprising microprocessor readable and executable instructions that cause the microprocessor to:

receive, from a first communication endpoint, a first SIP REGISTER message, wherein the first SIP REGISTER message indicates that the first communication endpoint does not support an Alternative Network Address Type (ANAT);

receive a first SIP INVITE message directed toward the first communication endpoint with a first Session Description Protocol (SDP) offer that comprises an ANAT encoding and/or an ANAT option registration tag; and send a 4XX SIP response message in response to receiving the first SIP INVITE message directed toward the first communication endpoint with the SDP offer that comprises the ANAT encoding and/or the ANAT option registration tag.

10. The system of claim 9, wherein the SDP offer in the first SIP INVITE message comprises the ANAT encoding.

11. The system of claim 9, wherein the instructions further cause the microprocessor to:

receive a second SIP INVITE message with a second SDP offer that does not comprise the ANAT encoding or the ANAT option registration tag; and forward the second SIP INVITE message to the first communication endpoint in response to receiving the second SIP INVITE message with the second SDP offer that does not comprise the ANAT encoding or the ANAT option registration tag.

12. The system of claim 11, wherein the instructions further cause the microprocessor to:

receive, from a second communication endpoint, a second SIP REGISTER message that indicates that the second communication endpoint does not support the ANAT, wherein the first communication endpoint and the second communication endpoint are associated with an address of record of a user; and forward the second SIP INVITE message to the second communication endpoint in response to receiving the second SIP INVITE message with the second SDP offer that does not comprise the ANAT encoding or the ANAT option registration tag.

13. The system of claim 9, wherein the SDP offer in the first SIP INVITE message comprises the ANAT option registration tag.

14. The system of claim 9, wherein the 4XX SIP response message comprises a SIP 420 BAD EXTENSION message.

15. The system of claim 9, wherein the instructions further cause the microprocessor to:

receive, from a second communication endpoint, a SIP 200 OK message with a second SDP offer that does not comprise the ANAT encoding.

16. The system of claim 9, wherein 4XX SIP response message is one of: a SIP 400 BAD REQUEST message, a SIP 401 UNAUTHORIZED message, a SIP 405 METHOD NOT ALLOWED message, a SIP 406 NOT ACCEPTABLE message, a SIP 409 CONFLICT message, a SIP 412 CONDITIONAL REQUEST FAILED message, a SIP 420 BAD EXTENSION message, a SIP 421 EXTENSION REQUIRED message, a SIP 470 CONSENT NEEDED message, a SIP 480 TEMPORARILY UNAVAILABLE message, a SIP 481 CALL/TRANSACTION DOES NOT EXIST message, a SIP 485 AMBIGUOUS message, a SIP 486 BUSY message, a SIP 488 NOT ACCEPTABLE HERE message, or a SIP 489 BAD EVENT message.

17. A method comprising:

receiving, by a microprocessor and from a first communication endpoint, a first SIP REGISTER message that indicates that the first communication endpoint does not support an Alternative Network Address Type (ANAT);

receiving, by the microprocessor, a first SIP INVITE message with a first Session Description Protocol (SDP) offer that comprises an ANAT encoding and/or an ANAT option registration tag, in response to receiving the first SIP INVITE message with the SDP offer that comprises the ANAT encoding and/or the ANAT option registration tag, and the first communication endpoint not supporting the ANAT, changing, by the microprocessor, the first SIP INVITE message by removing the ANAT encoding and/or the ANAT option registration tag; and sending, by the microprocessor, the changed first SIP INVITE message to the first communication endpoint.

18. The method of claim 17, wherein the SIP REGISTER message indicates that the first communication endpoint is IPV6 intolerant, wherein changing the first SIP INVITE message further comprises: changing, in the SDP offer, one or more IPV4 addresses to IPV6 addresses.

19. The method of claim 17, further comprising:

receiving a SIP 200 OK message from the first communication endpoint, wherein the SIP 200 OK message does not comprise the ANAT encoding and/or the ANAT option registration tag, in response receiving the SIP 200 OK message, modifying the SIP 200 OK message by adding the ANAT encoding and/or the ANAT option registration tag; and forwarding the modified SIP 200 OK message.

20. The method of claim 17, further comprising:

receiving, from a second communication endpoint, a second SIP REGISTER message that indicates that the second communication endpoint does not support the ANAT, wherein the first communication endpoint and the second communication endpoint are associated with an address of record of a user; and in response to receiving the first SIP INVITE message, forwarding the changed SIP INVITE message to the second communication endpoint.

* * * * *

UNITED STATES PATENT AND TRADEMARK OFFICE
CERTIFICATE OF CORRECTION

PATENT NO. : 10,904,299 B2
APPLICATION NO. : 15/617650
DATED : January 26, 2021
INVENTOR(S) : Lukac et al.

Page 1 of 1

It is certified that error appears in the above-identified patent and that said Letters Patent is hereby corrected as shown below:

In the Claims

At Column 16, Line 12, after "registration tag;" insert --and-- therein.

Signed and Sealed this
Second Day of March, 2021

Drew Hirshfeld
*Performing the Functions and Duties of the
Under Secretary of Commerce for Intellectual Property and
Director of the United States Patent and Trademark Office*